March 24, 1970    A. BALINT ET AL    3,502,409
MALFUNCTION DETECTION SYSTEM FOR AUTOMATIC FILM PRINTERS
Filed May 26, 1967    4 Sheets-Sheet 3

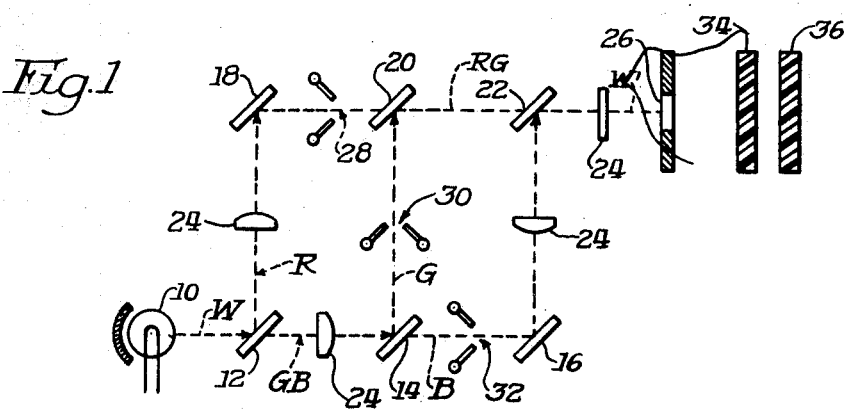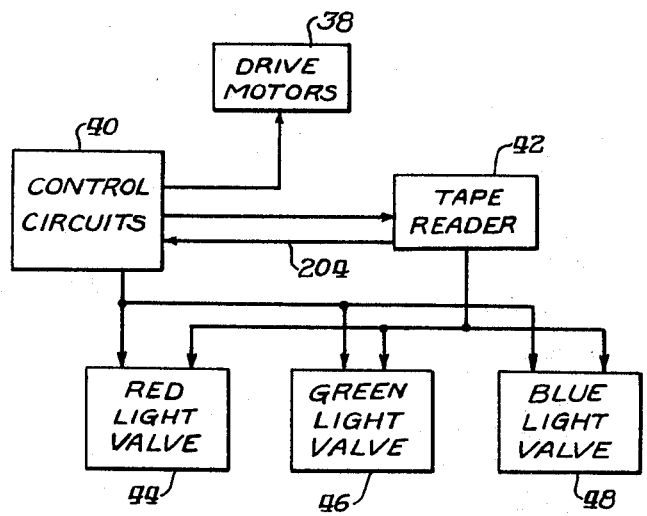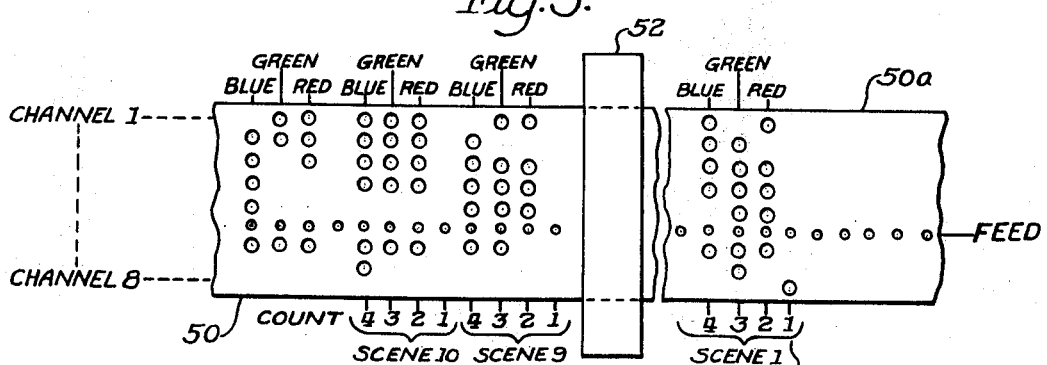

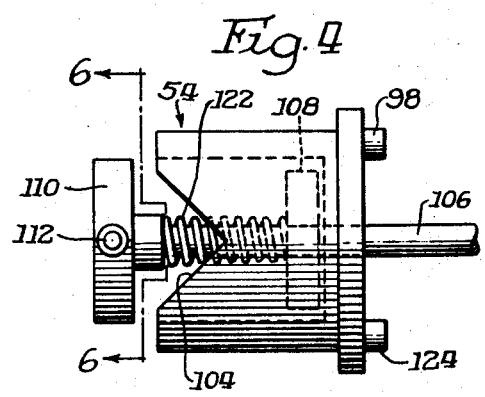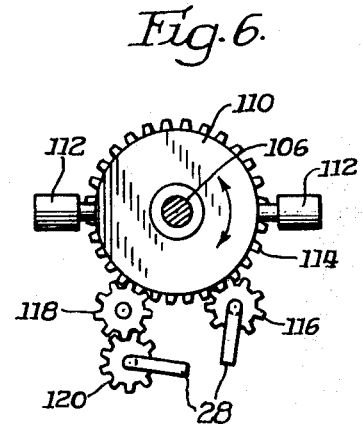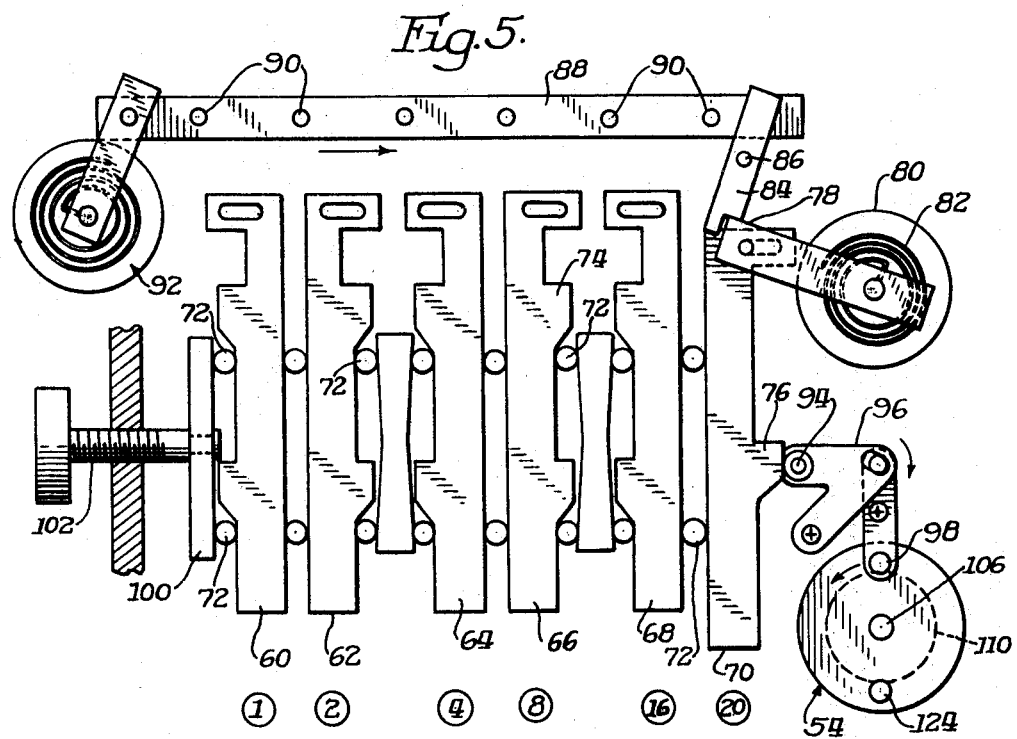

OPERATING CYCLE

Inventors:
Andrew Balint,
Willi G. Engel.
By Griffin & Branigan
Attys

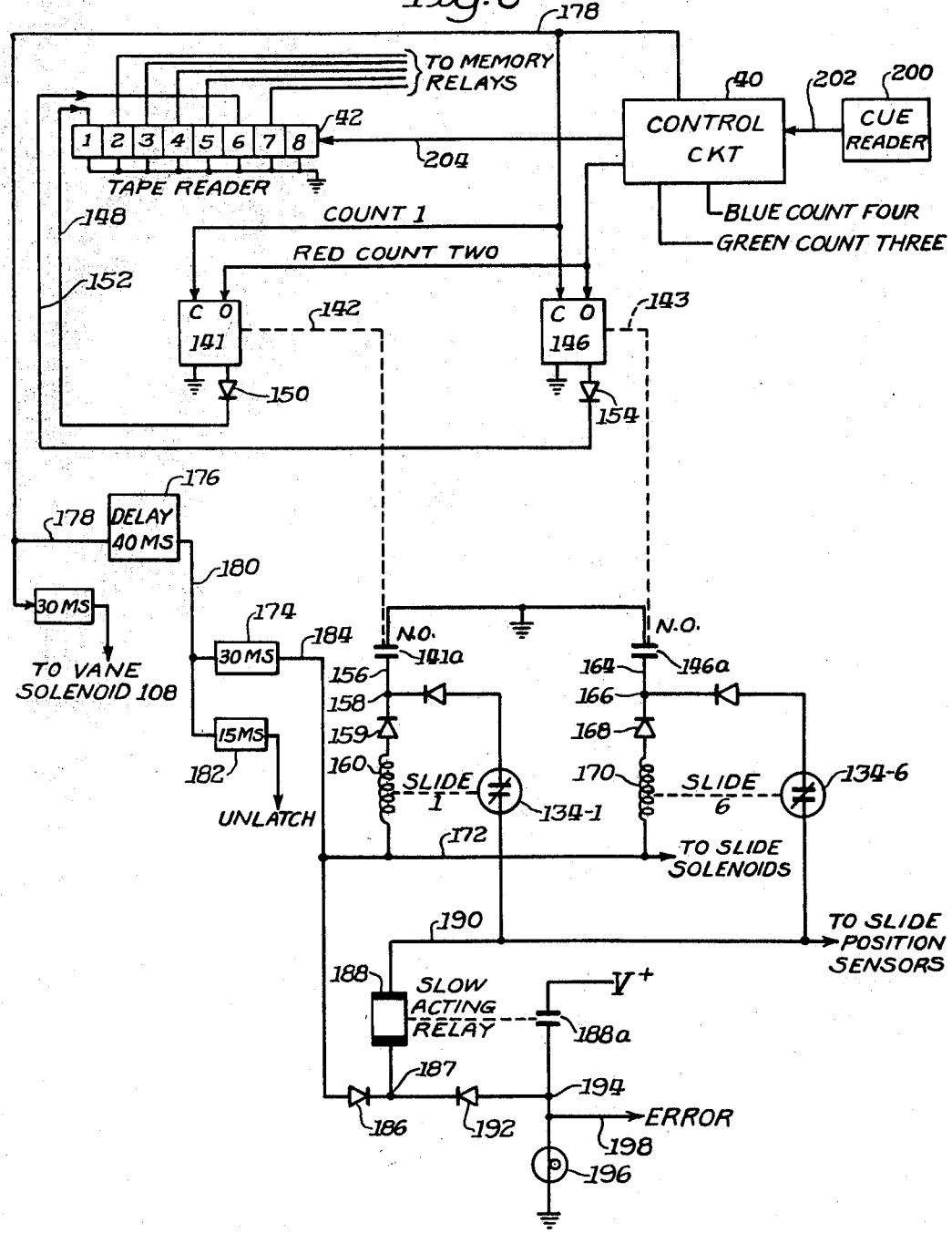

United States Patent Office 3,502,409
Patented Mar. 24, 1970

3,502,409
MALFUNCTION DETECTION SYSTEM FOR AUTOMATIC FILM PRINTERS
Andrew Balint, Park Ridge, and Willi G. Engel, Evanston, Ill., assignors to Bell & Howell Company, Chicago, Ill., a corporation of Illinois
Filed May 26, 1967, Ser. No. 641,532
Int. Cl. G03b 27/76, 27/04
U.S. Cl. 355—36                                    23 Claims

ABSTRACT OF THE DISCLOSURE

There is herein described a bar-type adder for adjustably controlling a vane or shutter which intercepts selectively predetermined portions of a film printer's light beam. A switching circuit including a plurality of reed switches is operative to instantly detect bar adder malfunctions thereby preventing the spoilage of vast quantities of film due to improper exposure.

---

During the printing of developed motion picture film onto raw film stock, various corrections must be made from scene to scene to compensate for such well-known factors as film density and color balance. One suitable type of light modulating system includes three dichroic mirrors for separating a light source into three primary color light beams. The light modulating means also includes three light valves each controlling a vane or shutter which may be adjustably set to intercept a predetermined portion of the light in one of the primary color beams. After the primary color beams pass through the light valves they are recombined and directed through an aperture and a color transparency so as to impinge on the raw film stock.

Each light valve includes a bar-type adder unit having a plurality of solenoid actuated slides. Signals representing correction factors are applied to the slide solenoids thereby causing the adder unit to expand linearly by an amount depending upon which of the slide solenoids have been actuated. This linear expansion is converted into an angular rotation by a vane memory. The angular position of the vane memory is subsequently sampled by actuating a vane solenoid which in turn moves a vane into the path of the primary color beam by an amount determined by the angular position of the vane memory.

Generally speaking, a motion picture film's light conditions change between scenes. Hence, the settings of the vanes or shutters must occur between the time that the last frame of one scene is exposed and the first frame of the next scene is exposed. Consequently, various types of control circuits have been develop for reading control information from tape readers which in turn control a memory means which is selectively operable to change the settings of the light valves. Conventionally, some form of indicia such as a conductive path is placed on the master film so as to produce a signal indicating a change from one sceen to the next. By transmitting this signal to the memory means, therefore, the light valves are adapted to be changed rapidly in accordance with the lighting condition information that has been previously stored in the memory means.

After a reel of film is printed it is developed and processed whereby it is suitable for projection. With existing automatic film printers, however, it is only at this time that lighting condition malfunctions of the printer are detected. Because of the time lag between the time that a film is exposed and the time that it is printed and available for detection of malfunctions, literally dozens of reels of films can be ruined before a malfunction can be detected. Moreover, automatic film printers are conventionally used in connection with 2,400 foot reels of 70 mm. film. Consequently, the financial considerations of an undetected malfunction can be of considerable consequence. It is an object of this invention, therefore, to provide a malfunction detection system whereby light valve malfunctions are detected before a particular scene is exposed or printed.

Particularly in connection with color photography, it is frequently desirable to intercept one or more of the primary color light beams. For example, if it is desired to eliminate all blue and green light from a particular scene so as to present it in a red hue, the blue and green light valves are completely closed. This situation is referred to as a "zero-cut" condition. Consequently, the light valves are conventionally adapted to be selectively completely closed so as to intercept the entire portion of one or more of the color beams. If a particular light valve's zero-cut mechanism malfunctions, therefore, the associated scene not only has undesirable color balance but in some cases is wholly unintelligible. It is another object of this invention, therefore, to provide a malfunction detection system for substantially instantly detecting malfunctions in a light valve's zero-cut mechanism.

In this latter respect, it should be noted that although the invention is described in terms of a color printing system it is equally applicable to use in connection with light valves employed in black and white film printing. Consequently, in the case where only one light valve is normally used, the detection of zero-cut malfunctions takes on even greater importance.

In accordance with the principle of the invention, each of the slides of the bar-type adder is provided with a detection means for detecting whether that particular slide is actuated in response to a slide actuation signal from the lighting condition control circuit. Similarly, the zero-cut mechanism is provided with a detection means for detecting whether it has been properly actuated in response to a suitable signal from the light condition control circuit. It either a slide or a zero-cut malfunction situation exists a malfunction signal is generated and the film printing operation is automatically terminated.

The foregoing and other objects, features and advantages of this invention will be apparent from the following more particular description of preferred embodiments thereof as illustrated in the accompanying drawings wherein the same reference numerals refer to the same parts throughout the various views. The drawings are not necessarily intended to be scale, but rather are presented so as to illustrate the principles of this invention in clear form.

In the drawings:

FIG. 1 is a schematic diagram of a color printer system employing the present invention.

FIG. 2 is a block diagram to be used in connection with a general description of the FIG. 1 printing system;

FIG. 3 is a schematic illustration of a typical storage medium as represented by a punched paper tape;

FIG. 4 illustrates details of a vane cam;

FIG. 5 is a schematic illustration of a bar-type adder;

FIG. 6 is a sectional view taken along the line 6—6 in FIG. 4 illustrating a vane armature, vane cam follower, and their co-action with typical vanes;

FIG. 8 is a circuit diagram of a malfunction detection circuit for use in connection with the invention's automatic film printer;

Figure 7:
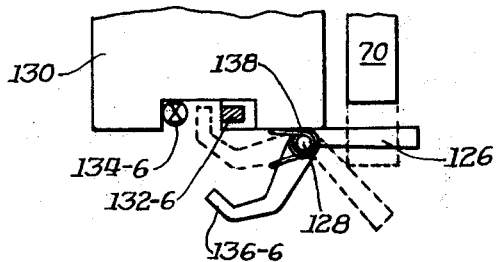
FIG. 7 is a fragmentary sectional view of a reed switch assembly illustrating the switch assembly's co-action with one of the bar adder's slides.

In a preferred embodiment of the invention the above mentioned objects are achieved by the use of reed switches mounted adjacent to each of the adder slides. Each reed switch is located so that its contacts open in response to desired motion of its associated slide. Hence, a given reed switch should be open shortly after its associated slide is actuated in response to a signal to the corresponding slide actuation solenoid. A subsequent error detection signal is then delivered to each of the reed switches. An error signal means is in circuit with each of these reed switches so that a closed reed switch causes the error detection signal to effectively actuate the error signal means which indicates a malfunction. In this manner, a malfunction signal is generated any time that a particular slide solenoid receives an actuation signal, but does not in fact suitably actuate its slide. Moreover, because the slides are set to their "memory" positions before the related scene is printed, the causative malfunction can be corrected before the exposure of film which would otherwise be spoiled.

The present invention is admirably suited for use in an additive color printer system such as is schematically illustrated in FIG. 1. The optical portion of the system includes a lamp or other light source 10, six dichroic mirrors 12–22, a suitable lens system represented by lens elements 24, an aperture 26, and three sets of vanes 28, 30, and 32.

White light W from source 10 is directed towards dichroic mirror 12. This mirror reflects red light in a beam designated R and transmits green and blue light in a beam designated GB. Dichroic mirror 14 reflects the GB beam's green light G and transmits the blue light B. Thus, the beam of white light is broken up into the three primary color beams of red, green and blue.

The red light reflected from the mirror 12 is reflected again at a mirror 18 so as to travel through vane 28 to a mirror 20. Means to be described shortly vary the setting of vanes 28, thus varying the cross section of the red beam.

The green light reflected by mirror 14 passes through vanes 30 to the mirror 20 and means are provided for adjusting the vanes 30 to vary the cross-sectional area of the beam passing through them. Dichroic mirror 20 reflects the green light and transmits red light so the red and green beams are combined at mirror 20 into beam RG and transmitted to mirror 22.

The blue light beam transmitted by mirror 14 passes through vanes 32 and is reflected at mirror 16 towards mirror 22. The vanes 32 are adjustable so as to vary the cross-sectional area of the blue light beam.

Mirror 22 reflects the blue light beam and transmits the red and green light beams. Hence, the light beam output from mirror 22 is a white light beam W' that is color and intensity corrected according to the settings of the vanes 28, 30, and 32. In this respect, full closure of one of the vanes (zero-cut) results in zero intensity for that particular color, whereby the light from mirror 22 is something other than white. In any event, the corrected beam is directed through aperture 26 and a master film strip 34 onto raw film stock 36. The master film strip 34 may be any transparency, but for the purpose of distinguishing it from the raw film it is hereinafter referred to as a negative.

The negative 34 and the raw film stock 36 are moved past the aperture 26 by a suitable transport system (not shown) which is driven by drive motors 38 (FIG. 2). The drive motors are energized by control circuits 40 which control the starting and stopping of the drive motors, the step-by-step advance of a tape through a tape reader 42, and, indirectly, the setting of three light valves 44, 46, and 48 in accordance with correction data sensed from a tape 50 (FIG. 3). Control circuits of this type are more fully described in a co-pending application Ser. No. 573,083 by Andrew Balint which was filed on Aug. 17, 1966 and entitled "Film Printer Control Circuit."

It is the light valves 44, 46, and 48 which control the positioning of the vanes 28, 30, and 32, respectively.

FIG. 3 shows a typical program tape 50 suitable for use in the tape reader. The tape has 8 channels of perforations extending along the length of the tape. Correction data relating to corrections required during the printing operation are arranged as a sequence of characters with each character comprising one row of perforations extending transverse to the direction of tape movement. Each character may comprise perforations in none, one, or more of the tape channels. The perforations in channels 1 through 6 represent correction data and perforations in channel 8 represent a Start-Stop signal. Punches in channel 7 are used for control of fading apparatus which is not shown or described and forms no part of the present invention. Note also that the paper tape is merely illustrative of a host of suitable storage media. For example, a magnetic tape, or a wire memory would also be adequate.

The leader portion 50a of the tape 50 is blank and contains no perforations in any of the channels. This portion of the tape is the first to be fed under a set of star wheel readers 52 as the film printer system is placed in operation. When a start switch (not shown) is closed in the control circuits 40 of FIG. 2, the control circuits pulse the tape reader to advance the tape in a step-by-step fashion by means of a suitable drive means, not shown, which engages the tape's feed holes. This continues until the first hole is sensed in the program tape. This is always a Start-8 Hole punched in channel 8. When the channel 8 star wheel contact senses this hole, the tape reader feeds a signal to the control circuits 40. The control circuits start the drive motors 38 and perform an automatic sequence during which a clock pulse generator produces two sequences of four clock pulses to advance a counter (not shown) through two complete cycles.

On each cycle the counter produces four output pulses designated count 1, count 2, count 3, and count 4 (see FIG. 3). Each pulse advances the tape in the tape reader by one step and conditions circuits so that the data sensed from the tape can be used to set the vanes 28, 30, and 32 of the light valves 44, 46, and 48, respectively (FIG. 2).

As shown in FIG. 3, the red correction data is read from the tape when the counter is at count 2; the green correction data is read from the tape when the counter is at count 3; and the blue correction data is read from the tape when the counter is at count 4. This data is used to set the angular position of a vane cam 54 (FIG. 4) one of which is in each light valve.

Each of the light valves are substantially identical. Hence, only the red one will now be described with reference to FIG. 5. Therein, six slides 60–70 are adapted to be independently moved upwardly or downwardly between a plurality of rollers 72. The rollers, on the other hand, are constrained in a vertical direction, but are free to move from side to side in FIG. 5. Each of the slides has one or more cam surfaces thereon such as cam surface 74 on the upper right hand portion of slide 66; or cam surface 76 on the right hand portion of slide 70.

Each of the slides is moved in its vertical direction by an arm 78 of a corresponding slide solenoid 80. For purposes of simplicity only one such solenoid 80 is shown in the figure. In an actual structure, however, each of the slides is selectively actuated by an associated solenoid. The left hand side of the arm 78 is biased upwardly by means of a solenoid bias spring 82. A given slide is only moved downwardly, therefore, when its associated solenoid is actuated. In other words, when no current flows through its solenoid the biasing spring 82 urges its associated arm 78 upwardly (or clockwise in FIG. 5). Each slide also has a slide latch 84 associated with it and adapted to hold its corresponding slide in its downward position after current is removed from the associated slide solenoid 80.

As will become more meaningful later, the slide latches 84 (only one of which is shown) are pivotally mounted about pins 86 on a frame not shown. An unlatched bar 88, having a plurality of pegs such as 90, is moved back and forth in the figure by a spring biased arm and solenoid aassembly 92. Hence, as the unlatch bar 88 is moved to the right in FIG. 5 the latching arm 84 is pivoted from its illustrated latched position in a clockwise direction about its pin 86 to an unlatched position so that its associated slide, such as 70 in the example, returns to its upward position.

In operation, when one of the slide solenoids is actuated, its associated slide is moved downwardly between the rollers 72. As the slide's cam surface contacts one of the rollers the slide is forced to the right in the figure while at the same time forcing the remaining intermediate slides and slide 70 to the right by an equal amount. As this occurs, the cam surface 76 engages a roller 94 on bell crank 96 and pivots it to the right to rotate pin 98 of the memory cam assembly 54. (See also FIG. 4.)

Each of the slide cam surfaces extends a particular distance from the body of its associated slide. Slide 60's cam surfaces, for example, extend one unit to the left in FIG. 5; slide 62's cam surfaces extend two units to the right; and so on as indicated by the circled numerals below the respective slides; until slide 70's cam surface 76 extends to the right for 20 units. Hence, by properly selecting which of the slides are moved downwardly in connection with any given scene, the amount of the vane cam's rotation is selectively controlled. In addition, a manual or trim control is obtained by motion to the left or right of a plate 100 by means of a rotatable threaded shaft 102.

The vane cam 54 (FIG. 4) has a V-shaped cam surface 104 and is rotatable about shaft 106 in response to rotary motion of the pin 98 by the bell crank mechanism 96 of FIG. 5.

The vane cam also has a hollow central portion containing a vane solenoid 108 which is shown in dotted outline form in FIG. 4. The vane solenoid's armature 110 is also affixed to the shaft 106 and has a pair of cam followers or rollers 112. (See also FIG. 6.) The armature 110 also carries a gear 114 which drives a first gear 116 and, through an idler gear 118, drives a second gear 120. The drive shaft for the vane elements 28, 30, and 32 are mounted on these first and second gears. (See also FIG. 1.) In this respect only the red vanes 28 are shown in FIG. 6. The other vane cams and vane assemblies are identical, however, and will not be further described.

As noted above, the rightward movement of the slides in FIG. 5 is transferred through the bell crank assembly 96 to set the rotary position of the vane cam's V-shaped surface 104 with respect to the vane armature's rollers 112. When it is desired to change the position of the vanes 28, 30, and 32, therefore, the rollers 112 are drawn into the vane cam's V so as to rotate the armature 110 which in turn alters the position of its associated vanes. This is accomplished by applying a vane signal to the vane solenoid 108 thereby attracting the armature 110 to the right in FIG. 4. As the armature is attracted, the rollers 112 roll along the cam's surface toward the V to rotate the armature 110. As the armature rotates, the gear 114 rotates gear 116 in one direction and gear 120 in the opposite direction to thusly open or close the vane elements driven by these gears. A spring 122 in FIG. 4 disengages the cam's rollers from the cam surface upon termination of the vane signal which has been applied to the vane solenoid 108.

It has also been noted that it is sometimes desirable to completely close the vanes for a particular one or more of the primary colors. Although this could be accomplished by use of an additional slide the illustrated embodiment accomplishes a zero-cut condition by means of a suitable zero-cut solenoid and linkage assembly affixed to a pin 124 (FIGS. 4 and 5), which in turn is affixed to the vane cam in the same fashion as pin 98. In this manner, the vane cam 54 is rotated to a zero-cut memory position merely by actuating its associated zero-cut solenoid to rotate the vane cam in a manner substantially the same as that described above.

FIG. 7 illustrates a switch means which is opened or closed in accordance with whether a particular one of the slides is actuated. In this respect, each of the slides and each zero-cut solenoid has a switch assembly associated with it, but for purposes of simplicity only a single such switch means will be described. That is, the switch associated with the red slide 70 in FIG. 5. Located below each of the slides such as 70 in FIG. 7 is a shield member 126 which is pivotable about a pin 128 located on a mounting block 130. Also mounted on the block 130 are a permanent magnet 132–6 and a reed switch 134–6. In this respect, for purposes which will become more apparent later, the "–6" is used to designate the slide (70) and shield 136–6 associated with the tape 50's sixth channel. These two elements 132–6 and 134–6 are spaced apart from each other so that the shield end 136–6 of the shield member 126 is permitted to pass therebetween. The flux from the magnet 132–6 is normally operative to close the reed switch contacts. But when the shield 136–6 intercepts the magnet's flux the contacts are opened. Hence, when a particular slide is actuated the shield's end 136 is inserted between its asscciated reed switch and magnet whereby the reed switch is opened. When a slide is returned to its unactuated position, on the other hand, a bias spring 138 removes the associated shield end from its upward position in FIG. 7 and the reed switch closes.

FIG. 8 illustrates a particularly novel circuit for detecting whether one of the reed switches 134 has been opened at a proper time whereby an indication is provided of whether a given slide has been properly actuated when desired. The circuit includes a plurality of bistable memory relays of which 141 and 146 are merely illustrative; several such relays having been omitted from the drawings for purposes of simplicity. That is, each of the channels in the paper tape 50 (FIG. 3) has a corresponding memory relay to which signals from the corresponding tape channel are delivered. Memory relay 141 is associated with tape channel 1 in FIG. 3 and slide 60 in FIG. 5; while memory relay 146 is associated with tape channel 6 in FIG. 3 and slide 70 in FIGS. 5 and 7.

Each of the memory relays includes a "close" coil which is energized by pulsing an input terminal designated C; and an "open" coil which is energized by pulsing an input terminal designated O. As shown by dotted lines 142 and 143, the relays 141 and 146 also have a set of contacts 141a and 146a, respectively, associated therewith. A biasing means not shown holds these contacts in a closed position once the close coil has been energized even though the input pulse to the close coil has been terminated. The relay contacts are only opened, therefore, by a pulse through the relay terminal O to energize the open coil of the relay. On the other hand, the biasing means is insufficient to close the relay contacts once they have been opened. Thus, the relay contacts remain open even after an input pulse to the open coil is terminated. Consequently, although of a "normally open" type, the memory relays have a bistable nature. That is, when once opened they tend to remain open until a close signal is received; and when once closed they tend to remain closed until an open signal is received.

As noted above, appropriate signals are generated by the tape reader as the tape 50 passes under the starwheels 52 in FIG. 3. In the illustrated embodiment, and as will be described more fully shortly, the illustrated tape is "inversely punched." That is, the tape contains a perforation corresponding to each side that is to remain unactuated. Stated another way, the slides are actuated in accordance with the portions of the tapes that remain unperforated. The invention can also be employed in connection with a "positively punched" tape or other storage medium, but is illustrated in this manner so as to conform with the disclosure of a suitable control circuit in the above-noted co-pending application.

Returning now to the description of FIG. 8, the output from the tape reader's first channel is delivered on line 148 through a diode 150 to one side of relay 141's open coil. The output from the tape reader's sixth channel is similarly delivered on a line 152 through a diode 154 to one side of relay 146's open coil. These two relays (141 and 146) are associated with red memory for the red light valve. Similar relays are also associated with the green and blue memory units for the green and blue light valves, there being 21 such relays altogether—18 for controlling the operation of the six slide solenoids in each of the light valves and three for controlling the zero-cut solenoid in each of the light valves. In these respects, however, it will be appreciated that although only two relays are illustrated as receiving their inputs from a paper tape reader, and although a preferred embodiment of the invention is described in connection with 6-slide memory units, the invention is equally applicable to any one of a host of relay configurations whose inputs may be derived from something other than a paper tape reader. For example, the lighting condition information can equally as well be stored on a magnetic tape, or perhaps an optical reading device.

In the preferred embodiment, the other sides of the open coils for the relays 141 and 146 are commonly connected to the control circuit 40 for receipt of a "red count two" pulse from the control circuit. One side of each memory relay close coil is commonly connected to the control circuit to receive a "count one" pulse. The control circuit and its timing pulses will be described more fully later in connection with a description of FIG. 9 which is a timing diagram for illustrating the operation of the circuit being described.

One side of each of the relay contacts 141a and 146a is commonly connected to ground. The other side of the set of contacts 141a is connected by line 156 through a junction 158, and an isolating diode 159, to one side of the red light valve's first slide solenoid 160. The other side of the relay contacts 146a are similarly connected by line 164 through a junction 166, and an isolating diode 168, to one side of the red light valve's sixth slide solenoid 170.

The other sides of the slide solenoids are all commonly connected by line 172 to the output side of a 30 millisecond slide pulse generator 174. This element can be any conventional pulse generating means such as a single shot multivibrator which produces an output signal of 30 milliseconds duration each time a triggering pulse is applied to its input. In this respect, a 40 millisecond delaying means 176 receives a "count one" input pulse from the control circuit 40 on line 178 at the same time that the close coils of the memory relays receive their pulses. The delay means 176 therefore, produces an output pulse on line 180, 40 milliseconds after it receives a "count one" pulse from the control circuit 40. This delayed pulse is delivered to both the 30 millisecond slide pulse generator 174 and a 15 millisecond unlatching pulse generator 182.

In addition to being delivered to the close coils of each of the memory relays 141 and 146, the count one pulse is also delivered to each of the other memory relays which have not been illustrated. Consequently, at count one all of the memory relay contacts such as 141a and 146a are closed. Moreover, because the relays are of a bistable nature they remain in this closed condition until subsequently opened by energization of their respective open coils.

The 30 millisecond slide pulse from generator 174 is also delivered on line 184 through an isolating diode 186, to one side of the coil of a slow-acting relay 188. This relay is of the type which requires its coil to be energized for a relatively long period of time such as ten milliseconds, for example, before its contacts 188a close. The other side of the slow acting relay is commonly connected by line 190 to one side of each of the associated light valves' reed switches such as 134-1 and 134-6. These are the reed switches that were described in connection with FIG. 7 and are opened in response to actual actuation of each of their corresponding slides (70 in FIG. 7). That is, as noted earlier, these reed switches are normally closed but are opened in response to actuation of their respective slides as the shields 136 are moved into a position between the reed switch and the associated permanent magnet (132-6 in FIG. 7). Hence, when one of these switches is opened it provides an indication that its associated slide has in fact been actuated. As a corollary, if it is desired that a particular slide solenoid be energized, but its reed switch fails to open, its closure provides an indication that the particular slide was not in fact actuated.

The lower side of the slow acting relay 188 is also connected through junction 187, an isolating diode 192, and a junction 194 to one side of the slow acting relay's contacts 188a. The other side of the slow acting relay's contacts 188a is connected to a positive voltage source V+. The lower side of the slow acting relay's contacts 188a are also connected through the junction 194 and an error lamp 196 to ground. As indicated, additional error signal devices 198 such as a stop signal mechanism, not shown, can also be connected to junction 194 if desired.

Having described the structure of the invention, its operation will now be described in connection with the timing diagram of FIG. 9. In this respect it will be assumed that the printer has already been started and is just about to print its eighth scene. That is, a cue reader 200 in FIG. 8 has just read a cue signal from the master film and delivered an appropriate pulse on line 202 to the control circuit 40. The control circuit thereby initiated a vane pulse at the time $t_0$ (line 9 of FIG. 9) to the vane solenoid 108 (FIG. 4). Hence, as was described briefly above, each of the light valves was moved by an amount corresponding to the data that had been previously read from the tape and stored in the memory units in a manner which will now be described.

At the same time that the vane signal is generated the control circuit sends a "count one" pulse (line 1 of FIG. 9) to both the delay means 176 and the tape reader 42 on lines 178 and 204, respectively, in FIGS. 2 and 8. As previously noted the "count one" pulse also closes all of the memory relay contacts. The "count one" pulse to the tape reader causes it to advance and read the perforations in the tape which correspond to the desired changes in the lighting conditions that are to be controlled by the red light valve. Subsequent to the "count one" pulse appropriate contacts in the tape reader provide output pulses on each of its output channels for each of its perforations. For purposes of this description it will be assumed that the sixth channel contains no perforation for the ninth scene's red light correction date, but that the first channel does have such a perforation. Hence, at count two the tape reader's output channel 148 produces a signal through diode 150 to one side of the memory relay 141's open coil. Because the sixth channel contains no perforation, however, no such signal is delivered to the corresponding side of memory relay 146's open coil. These "count two" signals are generated at $t_3$ in FIG. 9. At the same time the "count two" pulse is delivered to the other side of each of the memory relay's open coils as illustrated in FIG. 8 and at line 2 of FIG. 9. Consequently, at count two the first memory relay 141 has its open coil energized, whereby its contacts 141a are opened. But the open coil for the sixth memory relay 146 is not energized whereby its contacts 146a remain closed. That is, as noted above, the relay contacts 141a and 146a were closed in response to the "count one" pulse from the control circuit at time $t_0$ and maintained in that closed position by virtue of the relay's bistable nature. After the "red count two" pulse has terminated the red memory relay contacts 141a and 146a are set and maintained in their open or closed positions depending upon whether their corresponding channels in the tape contain perforations or not. Subsequent to these operations the control circuit causes the tape to advance so that the tape reader senses the perforations relating to the green correction data.

A "green count three" pulse causes the tape's data to be applied to the relays of the green memory to open those relays corresponding to the channels having perforations relating to the green correction data. This operation is the same as that described above in connection with the red memory relays; the only difference being that the green correction data is stored in the green memory relays during count three, whereas the red correction data was stored in the red memory relays during count two.

The control circuit next causes the tape to be moved so that the line of perforations relating to the blue correction data is located under the tape reader.

A "blue count four" pulse is then generated by the control circuit and applied to the open coil on each of the relays in the blue memory and opens those relays corresponding to the blue channels of the tape having perforations relating to the blue correction data.

Figure 9:
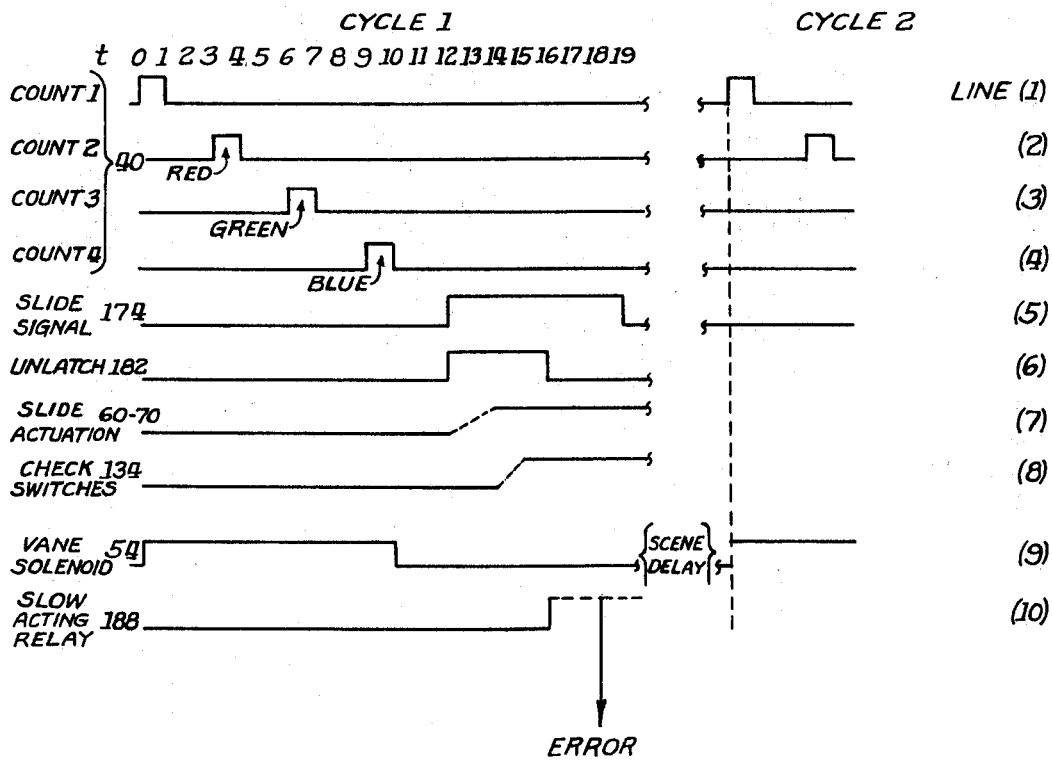
FIG. 9 is a timing diagram illustrating the relative times of occurrence of certain signals generated by the circuit of FIG. 8.

By $t_9$ in FIG. 9, therefore, all of the memory relays for all three of the light valves are set; but the slide solenoids are all de-energized.

At $t_{12}$ the delay means 176 produces an output on line 180 to both the 30 millisecond slide signal generator 174 and the 15 millisecond unlatch signal generator 182. (See lines 5 and 6 of FIG. 9.)

The slide pulse signal is delivered on lines 184 and 172 to one side of all of the slide solenoid coils (160 and 170 in FIG. 8). But a given slide solenoid only provides a complete path for the slide pulse signal if the corresponding memory relay is closed at $t_{12}$. Consequently, the only red slide solenoids that are energized are those whose memory relay received no perforation signal from the tape reader at $t_3$ ($t_6$ and $t_9$ in the case of the green and blue relays). In the particular illustration, for example, the sixth slide solenoid coil 170 is energized but the first slide solenoid's coil 160 is not energized. This is because the memory relay contacts 141a were re-opened in response to the preceding "red count two" pulse while the sixth red memory relay contacts 146a remained closed. Consequently, as illustrated in FIGS. 5 and 7 and at line 7 of FIG. 9, between $t_{12}$ and $t_{14}$ the arm 78 is rotated in a counterclockwise direction forcing the slide 70 downwardly into the position shown in dotted lines in FIG. 7. The shield 136-6 is thusly moved between the sixth slide solenoid's reed switch 134-6 and the permanent magnet 132-6.

A slide unlatching signal is also generated at $t_{12}$ to energize the slide unlatching solenoid 92 in FIG. 5 so that each of the solenoid latching arms 84 is pivoted about its pin 86 as to unlatch any of the slides that were latched downwardly during the time that correction data was being entered into the light valves during the preceding cycle. In this manner for any given cycle the only slides that occupy a downward position in FIG. 5 are those whose slides solenoids are actuated by virtue of the simultaneous occurrence of both the slide signal and a closed memory relay.

The slide pulse signal is also delivered through diode 186 to the coil of the slow-acting relay 188. In order for the slow-acting relay to be energized, however, its circuit must be completed through one of the reed switches 134 which function as slide position sensors. In addition, in order for the slow-acting relay's circuit to be complete one of the memory relay contacts such as 146a must also be closed. Consequently, the slow acting relay's contacts 188a are only closed when both a given set of memory contacts as well as the associated reed switches are closed. This, however, is a malfunction situation because at $t_{12}$ all of the closed memory relays provide a path for the slide signal from 174 to energize the corresponding slide solenoid so that the associated slide would be moved downwardly and the related reed switch opened. As illustrated at lines 7 and 8 of FIG. 9, because of the time required for each slide's mechanical motion, a given slide's memory contacts and position sensors are both closed between times $t_{14}$ and $t_{15}$. But because of its slow-acting nature the relay 188 does not close its contacts 188a until at least $t_{16}$. Consequently, under desired operating conditions the contacts 188a do not have an opportunity to close.

If, on the other hand, an error has occurred whereby a given set of memory contacts was programmed to a closed position, but its associated slide was not actuated, both the particular memory relay contacts as well as their associated switch would still be closed at $t_{16}$. This, therefore, would cause the slow-acting relay to close its contacts 188a and complete a circuit through the error light 196 or other error indicating means 198. Moreover, when the slow-acting relay's contacts 188 are closed the slow-acting relay itself is latched into an energized position by means of a completed circuit from V+, through contacts 188a, junction 194, diode 192, junction 187, the slow-acting relay coil itself, line 190, a slide position sensing reed switch 134, and its associated memory relay to ground. Consequently, the slow-acting relay remains energized even after the 30 millisecond slide signal pulse is removed at $t_{19}$ (line 5 of FIG. 9).

As noted on line 6 of FIG. 9, during the time that the desired slides are held in their downward positions by their slide solenoids (between times $t_{16}$ and $t_{19}$) the fifteen millisecond unlatching signal was removed from the unlatching solenoid 192. Hence, the various latching arms 84 were returned to their downward positions. Consequently, when the slide signal is removed each of the selected slides is latched in its downward position by its corresponding latching arm 84.

It will be appreciated from the preceding description that the present invention provides structure and circuits for instantly detecting malfunctions in the operation of a film printer's bar adder. In this manner, it is possible to not only prevent the spoilage of vast quantities of film due to improper exposure, but the entire printer can be shut down so that the malfunction can be corrected before there is any film spoilage at all.

The above structure was described in connection with a single slow-acting relay being associated with each of the light valves. Hence, in the illustrated embodiment a malfunction signal merely indicates that a particular light valve has malfunctioned, but it does not indicate which one or more of the slides have caused the error signal. It will be appreciated by those skilled in the art, however, that by including a separate slow-acting relay for each of the slides, each of the thusly included slow-acting relays can be used to control a separate error light for indicating which one or more of the particular slides has caused the malfunction. Similarly, merely by incorporating a suitable reed switch and slow-acting relay in a similar circuit with the "zero-cut" solenoid structure an error signal can also be generated for similar malfunctions of the various "zero-cut" solenoids.

The above structure has also been described in terms of the various slides malfunctioning in the sense that they were not driven to their downward or actuated positions in response to the signals delivered to their respective memory relays. Another type of malfunction, however, exists where a particular slide solenoid is inadvertently actuated whereby its associated slide is driven downwardly although the associated memory relay has not been energized. The invention also contemplates this type of a malfunction detection. For example, this type of malfunction may be detected merely by inserting normally open reed switches in series with a normally closed relay contact associated with the close coils of the various memory relays. These various suggested changes, however, are merely modifications of the invention which would be apparent to those skilled in the art after having read the above description. Consequently, for purposes of simplicity these modifications will not be further described.

Figure 10:
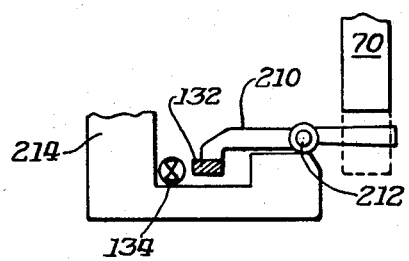
FIG. 10 is an alternative embodiment of a reed switch assembly.

While the invention has been particularly shown and described with reference to preferred embodiments thereof, it will be understood by those skilled in the art that various other changes in form and details may be made therein without departing from the spirit and scope of the invention. For example, the reed switch which is illustrated in FIG. 10 can be substituted for that described in connection with FIG. 7. That is, in FIG. 10 the magnet 132 is mounted on an arm 210 pivoted at 212 on a block 214. As in the FIG. 7 embodiment, downward motion of the slide 70 as shown by the dotted lines causes the arm 120 to pivot in a clockwise direction. In this case, however, instead of the magnet's flux being intercepted by a shield, the lines of flux themselves are removed from the area of the reed switch by virtue of the magnet's being pivoted upwardly in FIG. 10. In all other respects the invention operates in the same manner as was described above.

Function checking assemblies and circuits similar to the above described can also be used to check the operation of the vane solenoid mechanism. This mechanism includes a reciprocable solenoid shaft which is movable between a first position and a second position. A switch means, such as the reed switches above, can be actuated to indicate that the shaft has moved into or out of the first position. These switches, as above described, therefore, can control the entire printer or serve to light a lamp on a checking panel.

From the above illustrations, therefore, it should be apparent that the invention is not limited to its preferred embodiments, but only as defined in the following claims. In this respect, the embodiments of the invention in which an exclusive property or privilege is claimed are defined as follows:

1. In an automatic photographic printer of the type in which one or more vanes selectively vary the intensity of a light beam and wherein each vane is selectively controlled by an actuation means operative in response to intensity correction data signals from a suitable storage medium, the improvement comprising:
   means for presetting said actuation means to a position corresponding to said correction data signals; and
   checking means for comparing the position of said actuation means with said correction data signals to determine whether said actuation means has been preset in accordance therewith.

2. The apparatus of claim 1 wherein said checking means includes:
   one or more switches, each of said switches having a first and a second position;
   means operative in response to the pre-setting of said vane actuating means for selectively setting said switches into positions corresponding to that pre-setting; and
   means for comparing said switch positions with said correction data signals to determine whether switches and thereby said actuation means are in accordance with said correction data signals.

3. The apparatus of claim 2 wherein said switches are reed switches.

4. The apparatus of claim 3 wherein each of said reed switches includes a pair of electrical contacts and a magnetic means wherein said electrical contacts are maintained in said first position by the flux from said magnetic means; and
   a flux interrupting means associated with each of said reed switches, said flux interrupting means being operative during said pre-setting to interrupt the flux between the associated contacts and the magnetic means for changing said switch to said second position.

5. The apparatus of claim 3 wherein each of said reed switches includes a magnetic means movable from a first to a second position by the actuation means.

6. The apparatus of claim 1 wherein said actuating means includes a plurality of bar-adder slides which are adapted to be selectively actuated in response to the light intensity correction data signals from the storage medium and said checking means determines whether said slides are actuated in accordance with said correction data signals.

7. The apparatus of claim 6 wherein said checking means includes a switch associated with each of said slides, each of said switches having a first and a second position, said first position corresponding to a first position of its associated slide and said second position corresponding to a second position of its associated slide;
   each of said slides being operative upon motion from its first position to its second position to change its corresponding switch from said switch's first position to said switch's second position; and
   means for comparing said switch positions with said correction data signals to determine whether said switches and thereby said slides are in accordance with said correction data signals.

8. The apparatus of claim 7 wherein said switch means are reed switches.

9. The apparatus of claim 8 wherein each of said reed switches includes a pair of electrical contacts and a magnetic means wherein said electrical contacts are maintained in said first position by the flux from said magnetic means; and
   a flux interrupting means associated with each of said reed switches, said flux interrupting means being operative in response to motion of the corresponding slide to interrupt the flux between the associated contacts and the magnetic means for changing said switch to said second position.

10. The apparatus of claim 8 wherein each of said reed switches includes a magnetic means moveable from a first to a second position by the corresponding slide.

11. The apparatus of claim 6 including a means for sensing said correction data from said storage medium;
    second storage means for storing indications of the correction data sensed from said storage medium;
    a solenoid corresponding to each of said slides;
    means for delivering an actuation signal to each of said slide solenoids wherein said slide solenoids are adapted to be energized only upon the simultaneous presence of a slide actuation signal and a corresponding signal being stored in said second storage means;
    a switch corresponding to each of said slides, each of said switches having a first and a second position and adapted to be changed from said first position to said second position upon motion of the corresponding slide; and
    comparison means for comparing the position of said switch means with said data correction signals after said slide actuation signals to determine whether said switch means and thereby said slides are in a position corresponding to said correction data signals.

12. The apparatus of claim 11 wherein the comparison means includes a slow-acting relay in circuit relationship with said switch means.

13. Apparatus according to claim 6 wherein said checking means comprises:
    a control means adapted to generate first and second control signals;
    a storage element corresponding to each of said slides and having a first and a second state;
    means operative in response to a first control signal from said control circuit for sensing said correction data from said storage medium and setting selected storage means in said second state to thereby store indications of said correction medium and data in said selected storage elements;

a slide actuation means corresponding to each of said slides and in circuit with the corresponding means;

a slide position sensing means corresponding to each of said slides and having a first state when its slide is not actuated and a second state when said slide is actuated;

a slow acting switch having a normal position and an error position;

means for delivering said second control signal to said slide actuation means and said slow acting switch;

said slide actuation means being operative to actuate its slide in response to the simultaneous occurrence of said second control signal and the setting of the corresponding storage element in said second state, to actuate the corresponding slide so that the corresponding slide position sensing means is placed in its second state within a predetermined time after the generation of said second control signal;

said slow acting switch being operative to switch into said error position after said predetermined time in response to the simultaneous presence of a slide position sensing means in its second state and the corresponding storage element in its second state; and error signal means for providing an error signal when said slow-acting switch is in said second position, whereby an error signal is generated when one of said slides is not actuated in accordance with the storage medium's correction data.

14. Apparatus according to claim 13 wherein said control means is adapted to reset each of said storage elements to said first state prior to generation of said first control signal.

15. Apparatus according to claim 14 including a delay means; and said reset signal being delivered to said delay means which is operative after a predetermined delay to generate said second control signal.

16. Apparatus according to claim 13 wherein said slow acting switch is a relay having a coil and a set of contacts; and said contacts being operative to close after said predetermined time in response to said second signal being delivered to said coil, said closed contact position being said error position.

17. Apparatus according to claim 16 including a holding voltage source;

first means for connecting one side of said contacts to said holding voltage source; and second means for connecting the other of said contacts to said coil so that said contacts remain closed after said second control signal has terminated.

18. Apparatus according to claim 17 wherein said slide position sensing means are reed switches.

19. Apparatus according to claim 18 wherein each of said reed switches includes a pair of electrical contacts and a magnetic means wherein said electrical contacts are maintained in said first position by the flux from said magnetic means; and a flux interrupting means associated with each of said reed switches, said flux interrupting means being operative in response to motion of the corresponding slide to interrupt the flux between the associated contacts and the magnetic means for changing said switch to said second position.

20. Apparatus according to claim 18 wherein each of said switches includes a magnetic means moveable from a first to a second position by the corresponding slide.

21. Apparatus according to claim 13 wherein said slide position sensing means are reed switches.

22. Apparatus according to claim 21 wherein each of said reed switches includes a pair of electrical contacts and a magnetic means wherein said electrical contacts are maintained in said first position by the flux from said magnetic means; and a flux interrupting means associated with each of said reed switches, said flux interrupting means being operative in response to motion of the corresponding slide to interrupt the flux between the associated contacts and the magnetic means for changing said switch to said second position.

23. Apparatus according to claim 21 wherein each of said reed switches includes a magnetic means moveable from a first to a second position by the corresponding slide.

References Cited

UNITED STATES PATENTS

| | | | |
|---|---|---|---|
| 1,572,798 | 2/1926 | Hubbard | 355—101 |
| 3,107,578 | 10/1963 | Engelage | 355—36 |

JOHN M. HORAN, Primary Examiner

U.S. Cl. X.R.

355—88